United States Patent Office 3,754,043
Patented Aug. 21, 1973

3,754,043
CONVERSION OF PERHALOALKANES
Geir Bjornson, and Homer M. Fox, Bartlesville, Okla., assignors to Phillips Petroleum Company
No Drawing. Filed July 29, 1970, Ser. No. 58,994
Int. Cl. C07c *17/20*
U.S. Cl. 260—653  7 Claims

ABSTRACT OF THE DISCLOSURE

Perhaloalkanes having from 2 to 6 carbon atoms per molecule are converted to different halocarbons and monohydrogen-substituted halocarbons by contacting a selected perhaloalkane feedstock with hydrogen chloride at temperatures in the range of 1200 to 1800° F.

---

This invention relates to organic halogen-containing compounds. More particularly, the invention relates to processes for the transformation of perhaloalkane compounds to different halocarbon compounds and monohydrogen-substituted halocarbon compounds.

Halocarbon compounds, i.e., compounds containing only the elements chlorine, fluorine, bromine, and mixtures thereof and carbon, are widely used as refrigerants, aerosol propellants, intermediates for the preparation of polymeric materials, and the like. Commercially, many of such compounds are usually prepared by the fluorination of a chlorinated methane such as carbon tetrachloride with anhydrous hydrogen fluoride, preferably in the presence of fluorine-containing metal salts such as antimony chlorofluorides. Such processes produce significant amounts of halogenated hydrocarbons having a lesser commercial value. It is, therefore, desirable to convert such by-product materials to more desirable compounds.

It has now been discovered that certain perhaloalkane compounds can be converted into other and different halocarbons and monohydrogen-substituted halocarbons, i.e., compounds containing only a single hydrogen atom in addition to carbon and the same or different halogen atoms.

Thus, in accordance with this invention, there is provided a process whereby a selected feedstock comprising one or more of certain hereinafter described halocarbon starting materials is contacted with hydrogen chloride in the vapor phase to form halocarbons having a different halogen configuration and the same or different number of carbon atoms in relation to the feedstock material and hydrogen-substituted, particularly monohydrogen-substituted, halocarbons.

The organic starting materials utilized in the practice of the invention are perhaloalkanes, i.e., compounds containing only chlorine, fluorine, or mixtures thereof and carbon, containing from 2 to 6 carbon atoms, inclusive. Of the foregoing materials, the lower perhaloalkanes containing from 2 to 4 carbon atoms, inclusive, are preferred.

Generally, the practice of the invention for converting a perhalo-alkane feedstock into other more desirable halocarbon and monohydrogen-substituted halocarbon materials comprises contacting the perhaloalkane feedstock in the vapor phase at elevated temperatures with hydrogen chloride. The process of the invention is preferably conducted under continuous flow conditions by passing vaporized perhaloalkane feedstock in contact with vaporized hydrogen chloride through a reaction zone heated to the particular reaction temperature. The reaction vessel in which the reaction is conducted should be composed of a material which is inert to the reaction and the reaction products. Materials such as quartz, nickel, Monel, or Inconel have proved to be satisfactory materials for the construction of reaction chambers. The chamber need not be wholly composed of the inert material but may be lined with it. The process may be carried out in a batchwise or semicontinuous method of operation if desired; however, as noted, a continuous method of operation is preferred. The reaction product can be recovered by means known in the art.

Perhalocarbons, i.e., halocarbons containing only chlorine, fluorine, or mixtures thereof, and carbon, which are converted according to the invention have the formula

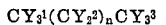

wherein $n$ is an integer from 0 to 4, preferably 0 to 2, and $Y^1$, $Y^2$ and $Y^3$ are the same or different and each is a halogen atom selected from the class consisting of chlorine, fluorine, or mixtures thereof. Admixtures of perhaloalkanes can be employed as feed material if desired. Exemplary of suitable perhaloalkanes are 1,2-dichloro-1,1,2,2-tetrafluoroethane; 1,1-dichloro - 1,2,2,2-tetrafluoroethane; hexafluoroethane; hexachloroethane; tetradecachlorohexane; 1,3,5-trichloro-1,1,2,2,3,4,4,5,6,6,6-undecafluorohexane and the like.

A particular feature of the invention is the requirement that the vapor phase transformation of the perhaloalkane feedstock to different halocarbon compounds and monohydrogen-substituted halocarbon compounds be effected in the presence of vaporized hydrogen chloride. The hydrogen chloride is employed in at least stoichiometric amounts, i.e., at least one mol of hydrogen chloride per mol of perhaloalkane feedstock material, with the amount being a function of the composition of the feedstock and desired product. In general, the molar ratio of hydrogen chloride to perhaloalkane feedstock will be in the range of 1–10:1, with a range of 1.2–5:1 being especially preferred.

The transformation of perhalalkanes in accordance with the invention is effected at temperatures in the range of 1200 to 1800° F. The processes which are operated at temperatures in the range of 1400 to 1550° F. are especially preferred, particularly when such processes are effected at higher space velocities, i.e., rate of throughput of material through the reaction zone per volume of reaction space per unit of time, and short contact times. The precise conditions of temperature, pressure, contact time, etc., for optimum operation of a particular conversion can be determined by test runs.

The contact or residence time of the reactants, i.e., the duration of contact between the vaporized reactants in the reaction zone under reaction conditions, while not critical, is a factor in the degree of conversion and selectivity of conversion to a particular product mix. Generally, reaction contact times in the range of about 0.01 to 1000 seconds are suitable in effecting conversions according to the invention. Preferred are contact times in the order of 0.2 to 60 seconds.

The process of the invention can be operated over a wide range of pressures from subatmospheric to superatmospheric. The process is advantageously operated at atmospheric conditions, although it is preferred to maintain a slight positive pressure to aid in the flow of materials through the system. Normally, pressures are in the range of 0.5 to 10 atmospheres, with a range of 1.1 to 2.5 atmospheres being preferred.

The reactor may be constructed of any suitable material capable of withstanding the reaction temperatures in the presence of reactant and products. Preferably, materials which are substantially inert to the reaction environment are employed. Among materials which can be used are quartz, silica, graphite, nickel, Monel and Inconel.

The following example is illustrative of the invention.

EXAMPLE

Runs were made wherein a vaporized mixture comprising 93.5 weight percent $CClF_2$—$CClF_2$ and 6.5 weight percent CCl₂F—CF₃ was blended with vaporized hydrogen chloride and passed through a tubular reactor which was 10 mm. in length, 6 mm. in outside diameter, and 4 mm. in internal diameter. The reactor was fabricated of quartz. The effluent was analyzed by gas-liquid chromatography subsequent to scrubbing of hydrogen chloride. Relevant data are presented in the following Table I.

TABLE I

| Run number | 1 | 2 | 3 | 4 | 5 |
|---|---|---|---|---|---|
| Reaction conditions: | | | | | |
| Reaction temp., °F | 1,530 | 1,430 | 1,480 | 1,530 | 1,480 |
| Contact time, seconds | 0.29 | 0.67 | 0.41 | 0.29 | 0.11 |
| HCl used | Yes | Yes | Yes | Yes | No |
| HCl/(CClF₂CClF₂+CCl₂FCF₃) mol ratio | 1/1 | 1/1 | 2.2/1 | 1 | 0 |
| (CClF₂CClF₂+CCl₂FCF₃) conversion, percent | 16.4 | 8.5 | 10.1 | 18.3 | 3.5 |
| (Mol percent CClF₂CClF₂ +CCl₂-FCF₃ converted to product) | any | | | | |
| Formula: | Selectivity on a C₂ basis¹ | | | | |
| Cl₂F₂ | 46.0 | 48.1 | 48.3 | 48.3 | 46.3 |
| CF₃—CF=CF₂ | 14.7 | 14.6 | 13.5 | 13.6 | 17.5 |
| ClF=CF₂ | 8.0 | 6.0 | 6.4 | 10.2 | 2.9 |
| CHClF₂ | 5.8 | 6.1 | 9.5 | 7.7 | |
| CHF₃ | 5.4 | 2.1 | 2.6 | 3.3 | |
| Cl—(CF₂)₃—C | 3.7 | 8.2 | 3.8 | 3.0 | 10.0 |
| CF₂=CF₂ | 3.5 | 4.3 | 4.9 | 1.8 | 20.5 |
| CCl₃F | 1.0 | 1.1 | 1.0 | 1.4 | 0.7 |
| CCl₂F—CClF₂ | 1.5 | 0.5 | 1.2 | 0.5 | 0.3 |
| CCl₂=CF₂ | 0.4 | 0.1 | 0.2 | 0.5 | |
| CClF=CClF | 1.0 | 0.2 | 0.2 | 0.7 | |
| CF₃Cl | 2.2 | 1.2 | 0.2 | 1.6 | 1.5 |
| CClF₂—CF₃ | 0.8 | | | | 0.5 |
| Others | 6.0 | 8.5 | 8.2 | 7.4 | |

¹ Selectivity on a C₂ basis refers to the fact that the numbers presented are the percent of carbon atoms of the original halocarbon which go to produce the respective products.

This example demonstrates the improved conversions 1–4) as compared to a process where hydrogen chloride is produced according to the process of the invention (Runs not employed (Control Run 5). In particular, the valuable monohydrogen-substituted halocarbons CHClF₂ and CHF₃ which find use as air conditioner fluids are produced according to the process of the invention but not in the absence of added hydrogen chloride.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

That which is claimed is:

1. The process of converting perhalocarbon compounds to other halocarbon compounds having a different halogen configuration in relation to the feedstock perhalocarbon and to monohydrogen-substituted halocarbon compounds, said other halocarbon compounds and monohydrogen-substituted halocarbon compounds having the same or different number of carbon atoms than the feedstock perhalocarbon which comprises contacting in the vapor phase at a temperature in the range of about 1200° F. to about 1800° F. at least one perhaloalkane compound having the formula $$CY^1{}_3(CY^2{}_2)_n CY^3{}_3$$

wherein $n$ is an integer from 0 to 4 and $Y^1$, $Y^2$ and $Y^3$ are the same or different and each is a halogen atom selected from the class consisting of chlorine, fluorine, or mixtures thereof; with at least one mole of hydrogen chloride per mole of feedstock, and separately recovering the reaction product.

2. The process according to claim 1 wherein the molar ratio of hydrogen chloride to perhaloalkane feedstock is in the range of 1.0–10:1.

3. The process of claim 2 wherein said temperature is in the range of 1400 to 1550° F.

4. The process of claim 2 wherein said feedstock perhaloalkane comprises 1,2 - dichloro - 1,1,2,2-tetrafluoroethane and said different halocarbon conversion product comprises dichlorodifluoromethane.

5. The process of claim 4 wherein said molar ratio of hydrogen chloride to perhaloalkane feedstock is in the range of 1.2–5:1.

6. The process of claim 5 wherein said feedstock further comprises 1,1-dichloro-1,2,2,2-tetrafluoroethane and said different halocarbons are monohydrogen-substituted halocarbon compounds which further comprise hexafluoropropylene, chlorotrifluoroethylene, chlorodifluoromethane and fluoroform.

7. The process according to claim 1 wherein said reaction product comprises at least one halocarbon compound having a different halogen configuration and the same or different number of carbon atoms in relation to the feedstock perhalocarbon and at least one monohydrogen-substituted halocarbon compound having the same or different number of carbon atoms in relation to the feedstock perhalocarbon.

References Cited
UNITED STATES PATENTS 3,558,723   1/1971   Davis et al. _____ 260—653

DANIEL D. HORWITZ, Primary Examiner

U.S. Cl. X.R.

260—658 R